United States Patent
Blumenthal

(10) Patent No.: US 10,410,554 B1
(45) Date of Patent: Sep. 10, 2019

(54) DEVICES FOR PROVIDING GROUND-BASED ADVERTISING IN A PARKING LOT SETTING

(71) Applicant: Benjamin Elias Blumenthal, Dallas, TX (US)

(72) Inventor: Benjamin Elias Blumenthal, Dallas, TX (US)

( * ) Notice: Subject to any disclaimer, the term of this patent is extended or adjusted under 35 U.S.C. 154(b) by 0 days.

(21) Appl. No.: 16/193,534

(22) Filed: Nov. 16, 2018

Related U.S. Application Data

(62) Division of application No. 15/922,621, filed on Mar. 15, 2018.

(51) Int. Cl.
G09F 19/22 (2006.01)
G06Q 30/02 (2012.01)
G09F 27/00 (2006.01)

(52) U.S. Cl.
CPC ....... *G09F 19/228* (2013.01); *G06Q 30/0267* (2013.01); *G09F 27/007* (2013.01)

(58) Field of Classification Search
CPC ...... G09F 19/228; G09F 27/007; G09F 3/201; G09F 3/208; G06Q 30/0267
See application file for complete search history.

(56) References Cited

U.S. PATENT DOCUMENTS

| | | | | |
|---|---|---|---|---|
| 1,754,851 A * | 4/1930 | Dey | ................. | G09F 13/20 40/653 |
| 2,920,184 A * | 1/1960 | Kessler | ................. | E01F 9/547 362/152 |
| 4,730,146 A * | 3/1988 | Maser | ................. | H05B 33/08 313/511 |
| 4,907,361 A * | 3/1990 | Villard | ................. | G09F 19/22 362/153 |
| 5,772,357 A * | 6/1998 | Evans | ................. | E01F 13/105 256/13.1 |
| 5,848,830 A * | 12/1998 | Castle | ................. | A47G 27/0243 362/84 |
| 6,481,921 B1 * | 11/2002 | Fenimore | ................. | G09F 19/22 404/7 |
| 6,692,182 B1 * | 2/2004 | Fenimore | ................. | E01F 15/083 404/7 |

(Continued)

FOREIGN PATENT DOCUMENTS

WO    WO02/075704 A1    9/2002

OTHER PUBLICATIONS

Spot on Ads webpage, http://www.spotonads.com/products, 2014, 3 pages.

(Continued)

*Primary Examiner* — Gary C Hoge
(74) *Attorney, Agent, or Firm* — Standley Law Group LLP; Jeffrey S. Standley; Adam J. Smith

(57) ABSTRACT

A device for displaying advertising images in a parking lot having a plurality of parking spaces. A back unit is configured for placement at a predetermined position associated with one of the parking spaces in said parking lot. A cover is mounted to said back unit such that said back unit and said cover form an enclosed compartment. An electronic display is positioned within said enclosed compartment and is configured to display the advertising images. A controller is in electronic communication with the electronic display. A battery is electrically connected to said electronic display.

16 Claims, 6 Drawing Sheets

(56) References Cited

U.S. PATENT DOCUMENTS

| | | | |
|---|---|---|---|
| 7,351,003 B1* | 4/2008 | Fenimore | E01F 15/085 40/565 |
| 8,250,795 B2* | 8/2012 | Barbieri | G09F 7/002 40/606.01 |
| 2003/0099105 A1 | 5/2003 | Watson | |
| 2003/0147694 A1* | 8/2003 | Ryman | G09F 19/22 404/71 |
| 2004/0055483 A1* | 3/2004 | Thollin | G09F 13/20 101/35 |
| 2005/0229451 A1 | 10/2005 | Mullens et al. | |
| 2006/0239775 A1 | 10/2006 | Klassen | |
| 2007/0222633 A1* | 9/2007 | Blum | A47L 23/22 340/815.4 |
| 2008/0005947 A1* | 1/2008 | Barna | A63B 69/3661 40/629 |
| 2009/0282716 A1 | 11/2009 | Barbieri et al. | |
| 2010/0153311 A1 | 6/2010 | McCormick | |
| 2013/0132810 A1 | 5/2013 | Jandt | |
| 2014/0020273 A1 | 1/2014 | DeMarco | |
| 2015/0096209 A1* | 4/2015 | Biehl | B64D 25/00 40/542 |
| 2015/0101222 A1* | 4/2015 | Hochfelsen | G09F 7/002 40/541 |
| 2016/0227897 A1* | 8/2016 | Jobling | G09F 3/0291 |
| 2017/0055138 A1 | 2/2017 | McDonnell et al. | |
| 2019/0108051 A1 | 4/2019 | Rygiel et al. | |

OTHER PUBLICATIONS

Appellstriping, Youtube Video of Parking lot advertising, https://www.youtube.com/watch?v=tRE4DR5lhhY, Nov. 9, 2018, 2 pages.

* cited by examiner

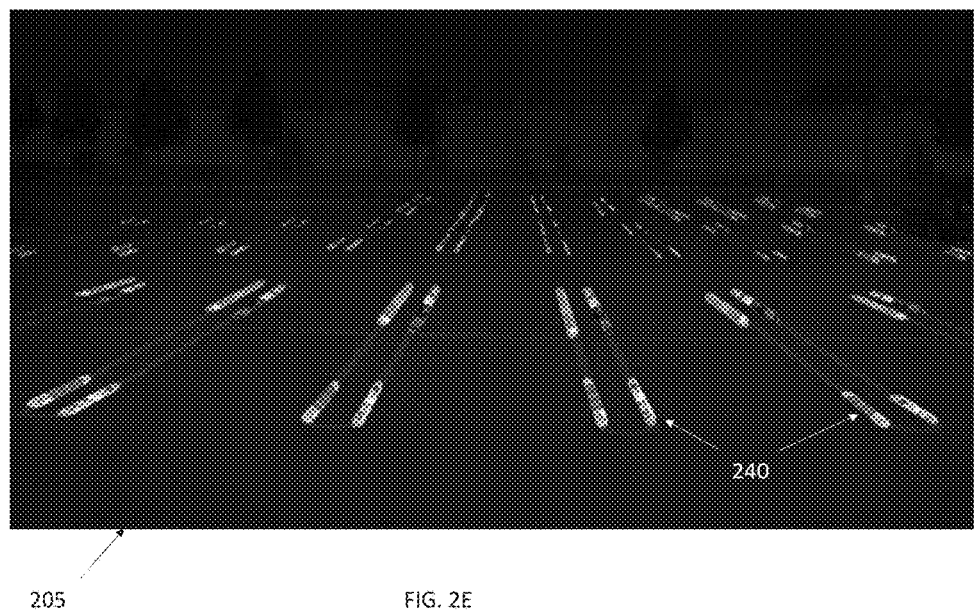
205  FIG. 2E ately place advertisement may offer a potential customer
DEVICES FOR PROVIDING GROUND-BASED ADVERTISING IN A PARKING LOT SETTING

CROSS-REFERENCE TO RELATED APPLICATIONS

This application is a divisional application of U.S. application Ser. No. 15/922,621 filed Mar. 15, 2018, the contents of which are incorporated by reference as if fully recited herein.

FIELD AND BACKGROUND OF THE INVENTION

The present invention, in some embodiments thereof, relates to devices for providing continuous street-level advertising in a parking lot. The instant invention, in some embodiments, allows for a plurality of advertisements to be placed, updated, and changed in a parking lot without interfering with normal vehicular traffic.

One of the most pressing business imperatives today is maximizing the value of a property, be it intellectual, brand-oriented or physical property. Sports stars use their brief careers to make money beyond their sports performance: endorsement, acting, and other fees often lead to greater income that base sports salaries. Maximizing income is often critical for profitability for a given investment or the like.

Advertising has evolved rapidly with the advent of Internet and mobile devices. Whereas in previous generations advertising was associated directly with print media, radio and television, today's advertising executives are constantly looking for ways to reach potential customers via cellular phones, live events (sports, music, etc.), and incessant Internet browsing.

One place where advertising can find mobile customers is in parking lot environments. When one parks his/her car, a properly place advertisement may offer a potential customer a quick look at a nearby product or opportunity, creating an impulse to purchase said product or take advantage of said opportunity. Whereas buses and subways are packed with advertisements, private cars generally sport no such things. Parking lots offer ideal venues for placing advertisements that drivers will necessarily see as they enter and leave such structures.

U.S. patent application Ser. No. 10/947,559 to Mullens, et al. teaches an invention relates to outdoor advertising and, more particularly, to methods, systems and apparatus for providing branded parking spaces. The invention includes using a standard parking space as an advertising space that creates an opportunity for advertisers to reach customers with branded messages at a place where they park a vehicle, creating an out-of-home advertising venue. The parking space can have an advertising message applied to it, such as on a sign placed within the parking space, adjacent to the parking space or in an area between two adjacent parking spaces. The advertising message can also be applied to the asphalt or concrete within the parking space, adjacent to the parking space or in an area between two adjacent parking spaces. The advertising message can also be applied to a canopy, overhang or ceiling that is within the parking space, adjacent to the parking space or in an area between two adjacent parking spaces. An agency or organization, such as an advertising media company obtains permission to apply an advertising message to one or more parking spaces. The advertising media company obtains an advertising message from or creates an advertising message for an advertiser, and in exchange for consideration, applies the advertising message to the parking space. The advertising media company can apply the advertising message to the parking space in accordance with a predefined arrangement between the advertising media company and the advertiser. The advertising media company can apply different advertising messages to a given parking space over a period time. The advertising message can be incorporated in a changeable form, such as a sign or an electronic display that is capable of displaying more than one advertising message. The advertising message can be transmitted to an available display device within a vehicle using wireless communication systems.

International Patent Application Number PCT/GB2001001125 to Moore describes an advertisement system comprises a surface (10) divided into a plurality of vehicle parking bays (12) by markings (11). Advertisements (13, 14, 15, 20) are associated with the parking bays (12). The advertisements (13, 14, 15, 20) may be associated with the markings (11) or located within the parking bays. A display device (16, 17, 20) may be used to display the advertisement. The display device may comprise a strip (20) of material carrying the advertisement and secured in position by an adhesive.

U.S. patent application Ser. No. 14/033,885 to DeMarco teaches an advertising display has support structures that attach to a pole. One or more advertising panels are mounted on the support structures to form an advertising display. The display may have the form of a cylinder, a triangle, a rectangle, an oval or other shapes. The display may optionally be tapered. The support structures may have a variety of score lines, at which the support may be folded as appropriate for the particular diameter of the pole. The panels may be secured to the supports by way of clips or other mechanical fasteners. Double-sided adhesive may be employed to secure ends of the panels, as desired.

SUMMARY OF THE INVENTION

It is therefore a purpose of the present invention, in some embodiments, to describe methods and devices for providing continuous, changeable advertising on the ground of parking lots and the like.

The invention includes a parking lot advertisement system, including the following: a parking lot including a plurality of parking spaces; a plurality of advertising back units adapted to be attached to predetermined positions defining the parking spaces in the parking lot; a plurality of clear covers adapted to be placed over and reversibly attached to the back units, wherein the back units and the covers define waterproof open spaces adapted to hold advertising material; a plurality of advertisements adapted in size to fit reversibly within the open spaces; a plurality of photovoltaic cells placed in proximity to the open spaces and adapted to convert sunlight into electricity; a battery adapted to store the electricity generated by the photovoltaic cells; a sensor for detecting low-light conditions; and, a plurality of LED's adapted to receive electricity from the photovoltaic cells or the battery and further adapted to illuminate the advertising material in low light conditions.

In one aspect of the system, there is additionally a camera and software adapted to identify a brand and model of car parked in proximity to the camera.

In another aspect of the system, the back units are attached to the predetermined positions with a weatherproof adhesive, bolts, screws, male/female elements, or other means.

In another aspect of the system, the back units are placed at a spacing so as to allow one vehicle to park between ever pair of the back units.

In another aspect of the system, the covers are selected from a hard, clear plastic, the covers being adapted to be opened and closed via a hinge and are further adapted to withstand weight of vehicles resting on or passing over the covers.

In another aspect of the system, the advertisements include at least one QR code or one RFID tag on each separate advertisement.

The invention also includes a parking lot advertisement system, including the following: a parking lot including a plurality of parking spaces; a plurality of advertising back units adapted to be attached to predetermined positions defining the parking spaces in the parking lot; a plurality of clear waterproof covers adapted to be permanently attached to the back units, wherein the covers includes slots adapted to accept advertising material in open spaces realized between the back units and the covers; a plurality of advertisements adapted in size to fit reversibly within the open spaces via the slots; and, a material capable of undergoing phosphorescence, wherein the material is adapted to provide lighting to the advertisements for at least a portion of nighttime hours.

In one aspect of the system, the back units and the waterproof covers are realized as single units, wherein each single unit includes a back unit adapted to be attached to the parking lot and a cover adapted to show advertising content placed beneath the cover in the open spaces.

In another aspect of the system, the material is realized as a zinc sulfide, strontium aluminate, calcium sulfide, or phosphorescent pigment.

The invention further includes a parking lot advertisement system, including the following: a parking lot including a plurality of parking spaces; a plurality of advertising back units adapted to be attached to predetermined positions in the parking lot and defining the parking spaces; a plurality of clear waterproof covers adapted to be placed over the back units, wherein the back units and the covers define open spaces adapted to hold advertising material; a plurality of display screens, wherein a single display screen is disposed between a single back unit and a single cover; a wireless Internet receiver; an electrical power source adapted to provide electrical energy to the plurality of display screens; and, a source of Internet-based content adapted to provide a plurality of advertisements to the displays, wherein the content is adapted to be changed after predetermined periods of time.

In one aspect of the system, the parking lot is realized as a plurality of parking lots.

In another aspect of the system, the back units are attached screws, nails, or metal plates.

In another aspect of the system, the electrical power is realized as solar-generated electricity.

In another aspect of the system, the content is realized as a plurality of prepaid advertisements.

In another aspect of the system, there is additionally a controller adapted to select which advertisements to display on which of the plurality of display screens.

In another aspect of the system, the covers are adapted to withstand weight of cars, trucks, and buses when the cars, trucks, and buses drive over or sit on the covers.

In another aspect of the system, the source of Internet-based content is adapted to send the content to the display screens wirelessly.

In another aspect of the system, the source of Internet-based content is realized as a server and wherein the wireless receiver is realized as a WiFi router.

In another aspect of the system, the advertisements are realized as video advertisements.

In another aspect of the system, the predetermined period of time is realized as 15 minutes, 30 minutes, 1 hour, 2 hours, 10 hours, 24 hours, one week, two weeks, or one month.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. It is noted that similar elements in various drawings may have the same number, advanced by the appropriate multiple of 100.

In the drawings:

FIG. 2E shows a night view of a parking lot with a plurality of advertising capsules;

DESCRIPTION OF SPECIFIC EMBODIMENTS OF THE INVENTION

The present invention, in some embodiments thereof, relates to systems for providing purpose-built, in-ground advertising systems for parking lots and similar mass vehicle venues. In some embodiments, the advertisements may be adapted to a profile of a driver associated with a car parking near an advertising element. In other embodiments, the advertisements may be periodically changed and/or lit up for night viewing.

For purposes of better understanding, some embodiments of the present invention are illustrated in the figures of the drawings. Without being bound by any theory, the following discussion is offered.

First Embodiment

The invention includes a parking lot advertisement system, including the following: a parking lot including a plurality of parking spaces; a plurality of advertising back units adapted to be attached to predetermined positions defining the parking spaces in the parking lot; a plurality of clear covers adapted to be placed over and reversibly attached to the back units, wherein the back units and the covers define waterproof open spaces adapted to hold advertising material; a plurality of advertisements adapted in size to fit reversibly within the open spaces; a plurality of photovoltaic cells placed in proximity to the open spaces and adapted to convert sunlight into electricity; a battery adapted to store the electricity generated by the photovoltaic cells; a sensor for detecting low-light conditions; and, a plurality of LED's adapted to receive electricity from the photovoltaic cells or the battery and further adapted to illuminate the advertising material in low light conditions.

In one aspect of the system, there is additionally a camera and software adapted to identify a brand and model of car parked in proximity to the camera for the purpose of customizing an advertisement most appropriate to the target audience. In another aspect of the system, the back units are attached to the predetermined positions with a weatherproof adhesive, bolts, screws, male/female elements, or other means. In another aspect of the system, the back units are placed at a spacing so as to allow one vehicle to park between ever pair of the back units. In another aspect of the system, the covers are selected from a hard, clear plastic, the covers being adapted to be opened and closed via a hinge and are further adapted to withstand weight of vehicles resting on or passing over the covers. In another aspect of the system, the advertisements include at least one QR code or one RFID tag on each separate advertisement.

Figure 1A:
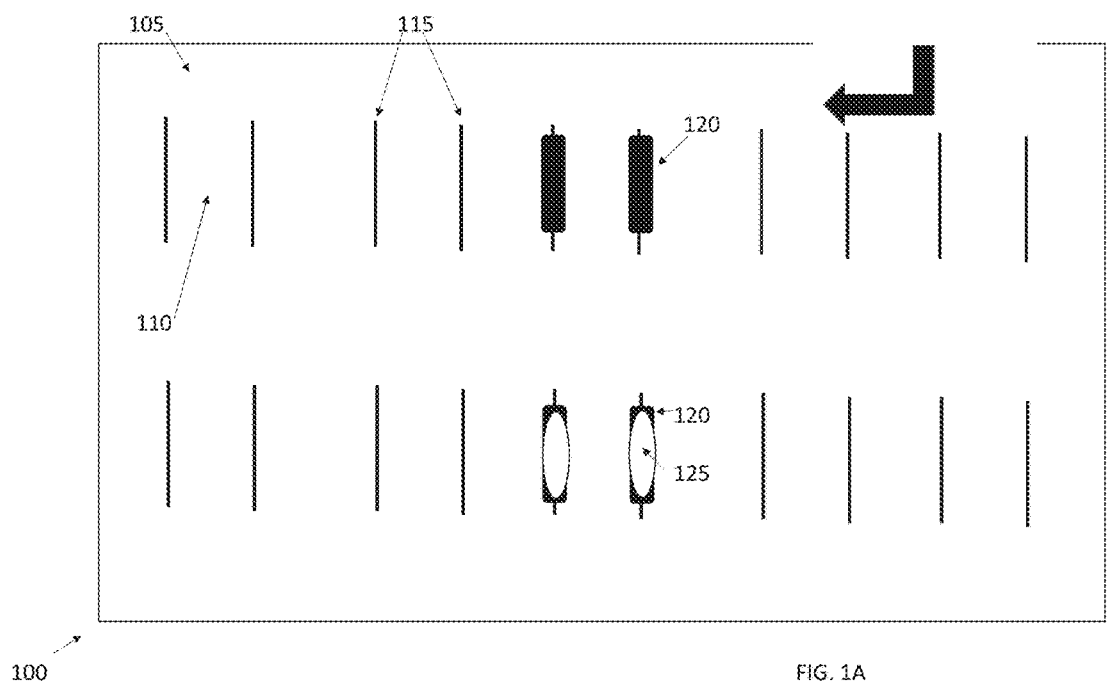
FIG. 1A shows a schematic view of a parking lot.

Attention is turned to FIG. 1A which shows an aerial view of the instant embodiment. A parking lot advertising system 100 includes a parking lot 105 divided into a plurality of parking spaces 110. Each parking space 110 is defined by one or a plurality of dividers 115 which may generally be realized as white or yellow paint or alternatively a raised cement structure. On such dividers 115 or in their place, advertising back units 120 are fixed to the ground of the parking lot 105. Fixing of back units 120 may be accomplished by any means, including but not limited to, bolting, screwing, gluing, attaching, fixing, and immobilizing.

Back units 120 may be covered with clear plastic covers 125 which are generally clear, waterproof, and adapted to withstand the weight of a car or truck either moving over or standing on said covers 125 without cracking, breaking or any deformation. Covers may be fastened, attached, joined, combined or otherwise associated transiently or permanently with the back units 120. A hinge (not shown in figure) is often used as a joining element between a back unit 120 and a cover 125. The space between the back unit 120 and the cover 125 is adapted to receive advertisements.

Figure 1B:
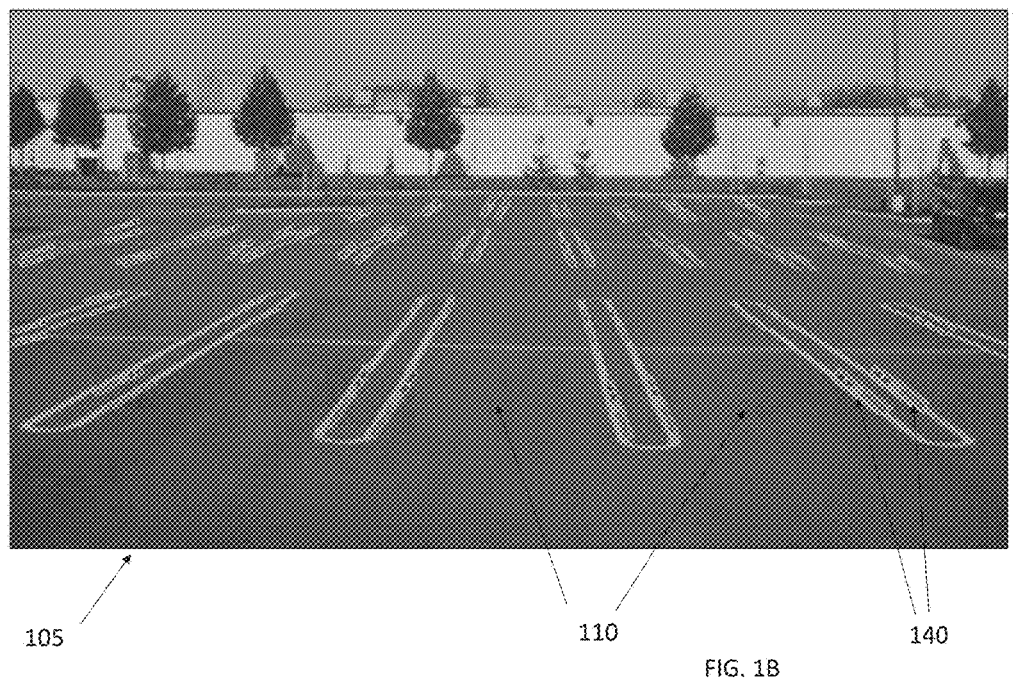
FIG. 1B shows a model of an embodiment of the instant invention.

FIG. 1B shows a schematic side view of the parking lot 105 with the advertising units 140 placed on the ground around parking spaces 110. Note that the advertising units 140 do not interfere with facile parking in the parking spaces 110. The advertising units 140 are adapted to withstand passing and standing vehicles without damage or deformation.

Figure 2A:
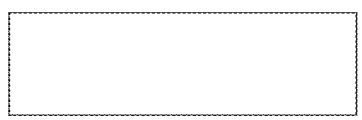
FIG. 2A shows a back unit for an embodiment of the instant invention.
Figure 2B:
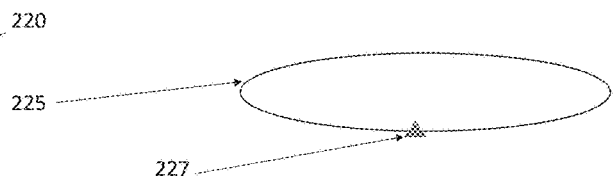
FIG. 2B shows a plastic cover for an embodiment of the instant invention.
Figure 2C:
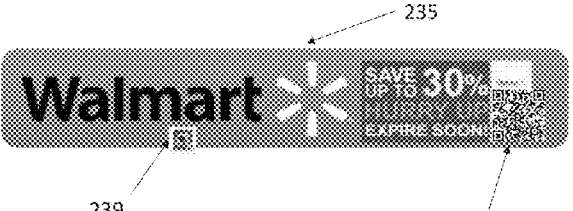
FIG. 2C shows a schematic view of an advertisement for use in an embodiment of the instant invention.

Attention is turned to FIG. 2A. A back unit 220 is shown. The back unit may be attached to the ground of a parking lot by any means, including but not limited to it being screwed in, attached to a holding mechanism placed in the ground, glue, bolting etc. FIG. 2B shows a cover 225 adapted to be placed over the back unit (FIG. 2A). The cover 225 is adapted to include hinges 227 to allow for facile opening and closing of cover 225 to replace advertisements. The back unit and the cover 225 together form a water-tight space into which an advertisement 235 (FIG. 2C) may be placed. Closing the cover 225 (FIG. 2B) over the back unit 220 (FIG. 2A) with the advertisement 235 (FIG. 2C) in the space yields a complete advertising unit. It is understood that the advertisement 235 may be made of any material including but not limited to paper and polymers, it may be color or black and white, it may show a plurality of advertisements based on optical perspective and the advertisement 235 may be realized as a plurality of advertisements. Advertisements 235 may optionally include QR codes 238 to allow for a consumer to take advertisement 235 data home or in-store with him/her. Alternatively or additionally, there may be one or more RFID chips 239 (FIG. 2C) associated with the advertisement 235 to allow for data tracking or communication between advertisement 235 and a mobile electronic device (not shown).

Figure 2D:
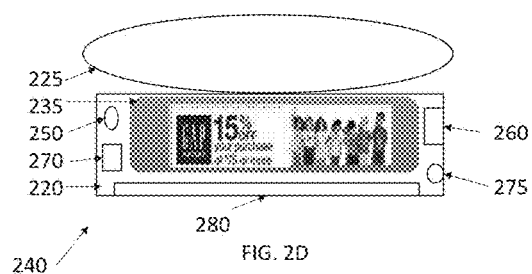
FIG. 2D shows a schematic view of an advertising capsule according to an embodiment of the instant invention.

Attention is turned to FIG. 2D. A back unit 220 includes a cover 225 hinged open and a polymer-based color advertisement 235. There is additionally a photovoltaic cell 250, a battery 260, a camera, 270 and a string of LED lights 280 associated with the back unit 220. The photovoltaic cell 250 and the battery 260 may be adapted to provide electricity to the LED lights 280 when a sensor 275 identifies low light conditions. The camera 270 may be adapted to identify cars parking next to the advertising unit or capsule 240.

FIG. 2E shows a parking lot 205 with a plurality of advertising capsules 240 lit up by LED lights from electrical energy stored it associated batteries. Electrical energy is generated by either grid power or associated photovoltaic cells and appropriate light sensors identify timing of turning on LEDS to illuminate the waterproof, crack-proof capsules 240.

Second Embodiment

The invention also includes a parking lot advertisement system, including the following: a parking lot including a plurality of parking spaces; a plurality of advertising back units adapted to be attached to predetermined positions defining the parking spaces in the parking lot; a plurality of clear waterproof covers adapted to be permanently attached to the back units, wherein the covers includes slots adapted to accept advertising material in open spaces realized between the back units and the covers; a plurality of advertisements adapted in size to fit reversibly within the open spaces via the slots; and, a material capable of undergoing phosphorescence, wherein the material is adapted to provide lighting to the advertisements for at least a portion of nighttime hours.

In one aspect of the system, the back units and the waterproof covers are realized as single units, wherein each single unit includes a back unit adapted to be attached to the parking lot and a cover adapted to show advertising content placed beneath the cover in the open spaces. In another aspect of the system, the material is realized as a zinc sulfide, strontium aluminate, calcium sulfide, or phosphorescent pigment.

Figure 3:
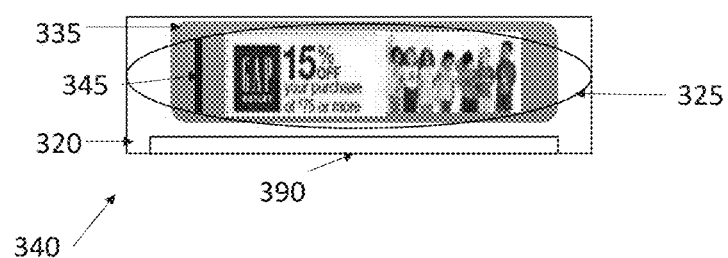
FIG. 3 shows a schematic view of an embodiment of the instant invention.

Attention is turned to FIG. 3. The instant embodiment lacks electricity, LED's and light sensors of the previous embodiment. Rather the parking advertisement capsule 340 includes a phosphorescent or similar material 390 that allows for lighting of an advertisement 335 for a portion of the nighttime. The parking advertisement capsule 340 does include a back unit 320 and a permanently-attached and non-openable clear hard-plastic cover 325 which together form a waterproof space for the advertisement 335 which may be realized as a plurality of advertisements. A covered slit 345 allows for insertion and removal of advertisement 335 as per timing and business arrangement with advertising entities.

Third Embodiment

The invention further includes a parking lot advertisement system, including the following: a parking lot including a plurality of parking spaces; a plurality of advertising back units adapted to be attached to predetermined positions in the parking lot and defining the parking spaces; a plurality of clear waterproof covers adapted to be placed over the back units, wherein the back units and the covers define open spaces adapted to hold advertising material; a plurality of display screens, wherein a single display screen is disposed between a single back unit and a single cover; a wireless Internet receiver; an electrical power source adapted to provide electrical energy to the plurality of display screens; and, a source of Internet-based content adapted to provide a plurality of advertisements to the displays, wherein the content is adapted to be changed after predetermined periods of time.

In one aspect of the system, the parking lot is realized as a plurality of parking lots. In another aspect of the system, the back units are attached screws, nails, or metal plates. In another aspect of the system, the electrical power is realized as solar-generated electricity. In another aspect of the system, the content is realized as a plurality of prepaid advertisements. In another aspect of the system, there is additionally a controller adapted to select which advertisements to display on which of the plurality of display screens. In another aspect of the system, the covers are adapted to withstand weight of cars, trucks, and buses when the cars, trucks, and buses drive over or sit on the covers. In another aspect of the system, the source of Internet-based content is adapted to send the content to the display screens wirelessly. In another aspect of the system, the source of Internet-based content is realized as a server and wherein the wireless receiver is realized as a WiFi router. In another aspect of the system, the advertisements are realized as video advertisements. In another aspect of the system, the predetermined period of time is realized as 15 minutes, 30 minutes, 1 hour, 2 hours, 10 hours, 24 hours, one week, two weeks, or one month.

Figure 4:
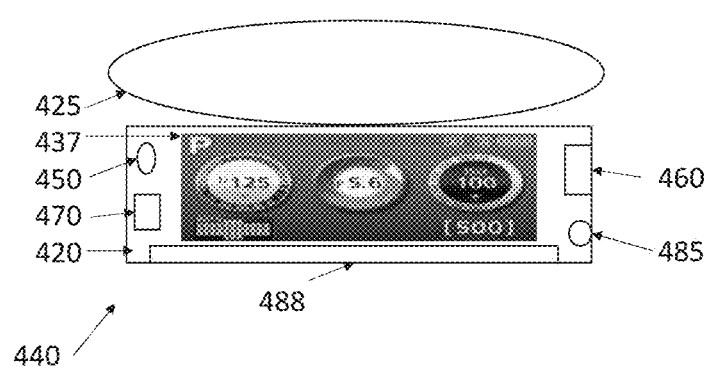
FIG. 4 shows a schematic view of an Internet-powered digital embodiment of the instant invention.

Attention is turned to FIG. 4. Showing a digital, Internet-based wireless parking advertisement capsule 440. The capsule 440 includes a ground-attachable back unit 420 including a cover 425 hinged open and a graphical user interface or display screen 437. There is additionally a photovoltaic cell 450, a battery 460, optional camera, 470 and wireless Internet source or router 485 associated with the back unit 420 and the display unit 437. The photovoltaic cell 450 and the battery 460 may be adapted to provide electricity to the display 437 to power advertising content delivered to the capsule 440 via a wireless router 485. The camera 470 may be adapted to identify cars parking next to the advertising unit or capsule 440. A controller 488 may be included to transfer and receive data via the Internet router 485 and control advertising material displayed on the display screen 437. Such control may include video, video animation, timing of advertisements, order of multiple advertisements, selection of advertisements for drivers of specific car makes and models as identified by the camera 470, and the like. The controller may be associated with capsule 440 or may be in wireless or wired communication with the capsule 440 while located at a position that allows for control for a plurality of capsules 440 in a parking lot.

EXAMPLE

A parking lot with 300 spaces for private cars was provided. At each separation line between spaces, two holes were drilled into the asphalt into which a sealant and an anchor were inserted. A base of an advertising capsule was placed over the holes containing the sealant and anchors. Two screws were drilled through the base of each capsule and into their respective anchors, thereby securing the bases to the asphalt. Contained within the bases are elements of night-lighting, including a light sensor, a PV solar panel, a battery and a string of LED lights. Printed paper advertisements are placed over each base and a clear capsule cover hinges closed on each base, securing an advertisement within each capsules. 300 of such capsules are installed using 600 screws and anchors. Advertisements are visible during the day without lighting assistance and are visible during the early hours of the night via the lighting elements contained within each capsule. Advertisements are sold for a duration of 1 month. At the end of the 1 month duration, each capsule is opened by a person using the hinged clear cover and the advertisements are replaced with new advertisements and again sealed with the clear covers.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. In addition, as used herein the term "about" refers to +/−10%. In addition, when the word "about" is used herein in reference to a number, it should be understood that still another embodiment of the invention includes that number not modified by the presence of the word "about."

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A device for displaying advertising images between parking spaces in a parking lot, in which the surface of the parking lot is considered ground level, said device comprising:
   a back unit configured for substantially flat placement at a position approximate ground level on said parking lot;
   a see-through cover adapted to be secured to and substantially co-planar with said back unit such that said back unit and said cover form an enclosed compartment;
   an electronic display positioned within said enclosed compartment and configured to display advertising images visible through said cover;
   a controller in electronic communication with said electronic display;
   a power source in electronic communication with said electronic display; and
   a camera in electronic communication with the controller, wherein said controller is configured to analyze information received from the camera in order to identify the presence of a vehicle located in close proximity with the device.

2. The device of claim 1 wherein:
   the position is between adjacent parking spaces in the parking lot.

3. The device of claim 1 further comprising:
   a content router in electronic communication with the controller and a network.

4. The device of claim 1 wherein:
   said cover is comprised of a transparent material.

5. The device of claim 1 wherein:
   said cover is mounted to said back unit in a hinged arrangement which permits the cover to move between an opened and a closed position; and
   said cover and the back unit provide a substantially watertight engagement when the cover is in the closed position.

6. The device of claim 1 wherein:
said controller is configured to analyze the information received from the camera in order to determine the make and model of the vehicle located in close proximity with the camera and direct the electronic display to display a particular one of the advertising images based upon the make and model of the detected vehicle.

7. The device of claim 1 wherein:
said cover and said back unit are adapted to withstand the weight of a personal vehicle tire load.

8. The device of claim 1 wherein:
said cover secured to said back unit is adapted to withstand shear forces created by a vehicle tire contacting the cover as the vehicle tire makes contact with the device.

9. The device of claim 1 further comprising:
a fastener adapted to pass through an aperture in said back unit for attaching the back unit to a surface of the parking lot.

10. The device of claim 1 wherein:
the electronic display includes a light source.

11. The device of claim 1 wherein:
the controller is configured to direct the electronic display to display a plurality of different advertising images over a period of time.

12. A system for displaying advertising images at approximately ground level of a parking lot having a plurality of parking spaces, said system comprising:
a plurality of back units, wherein each back unit is adapted to be attached between a plurality of adjacent parking spaces in the parking lot;
a plurality of covers, wherein each cover is transparent and is configured to be attached to and to rest substantially co-planar with a top surface of one of said back units to define a substantially watertight enclosed compartment between the respective back unit and the respective cover;
a plurality of electronic displays, wherein each electronic display is positioned within one of said enclosed compartments and is configured to display at least one advertising image;
a plurality of controllers, wherein each controller is located within one of the enclosed compartments and is in electronic communication with the respective electronic display; and
one or more cameras, wherein each camera is in electronic communication with at least one of the controllers, and wherein the controllers are configured to analyze information received from the respective camera to identify the make and model of a vehicle located within sufficient proximity of the respective camera that the make and model of the vehicle is identifiable and direct the respective electronic display to display a particular one of a plurality of advertising images based upon the identified make and model of the nearby vehicle.

13. The advertising system of claim 12 wherein:
the covers are each adapted to withstand the weight of a vehicle tire load.

14. The advertising system of claim 12 further comprising:
at least one router in electronic communication with at least one of the respective controllers.

15. A method for displaying advertising images in a parking lot having a plurality of parking spaces, said method comprising the steps of:
providing a back unit comprising an aperture for receiving a fastener;
securing said back unit at a predetermined position between two adjacent parking spaces in said parking lot by driving the fastener through said aperture;
mounting a transparent cover to the back unit to define an enclosed chamber, wherein said transparent cover is adapted to withstand the weight of a vehicle tire load;
providing an electronic display within said enclosed chamber;
electrically connecting a power source to said electronic display;
electrically connecting a controller to said electronic display;
displaying one of a plurality of advertising images on the electronic display;
providing a camera in electrical connection with the controller;
capturing, at the camera, an image of a vehicle;
determining, from the captured image, the make and model of the vehicle; and
directing, by way of the controller, the electronic display to display a particular one of the advertising images in response to the determination of the make and model of the vehicle.

16. The method of claim 15 further comprising the steps of:
displaying a different one of the advertising images after a predetermined amount of time has passed.

* * * * *